United States Patent
Garetto et al.

(10) Patent No.: US 11,642,001 B2
(45) Date of Patent: May 9, 2023

(54) RESERVOIR SYSTEM FOR A WASHING AGENT, IN PARTICULAR INTENDED FOR BEING INSTALLED ON A WASHING MACHINE, FOR EXAMPLE A DISHWASHER

(71) Applicant: ELBI INTERNATIONAL S.P.A., Turin (IT)

(72) Inventors: Luca Garetto, Rivoli (IT); Alessandro Pompa, Turin (IT); Marco Becchio, Carignano (IT); Paolo Ravedati, Moncalieri (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 165 days.

(21) Appl. No.: 17/107,438

(22) Filed: Nov. 30, 2020

(65) Prior Publication Data
US 2021/0161359 A1 Jun. 3, 2021

(30) Foreign Application Priority Data
Dec. 2, 2019 (IT) .................... 102019000022647

(51) Int. Cl.
*A47L 15/42* (2006.01)
*A47L 15/44* (2006.01)
*G01F 23/38* (2006.01)

(52) U.S. Cl.
CPC ....... *A47L 15/4418* (2013.01); *A47L 15/4246* (2013.01); *A47L 15/4445* (2013.01); *A47L 15/4463* (2013.01); *G01F 23/38* (2013.01); *A47L 2401/023* (2013.01)

(58) Field of Classification Search
None
See application file for complete search history.

(56) References Cited

U.S. PATENT DOCUMENTS

2004/0231710 A1    11/2004   Dingler

FOREIGN PATENT DOCUMENTS

| DE | 102010003774 A1 | 10/2011 |
| DE | 102013111613 A1 | 6/2014 |
| WO | 2011/101044 A1 | 8/2011 |

OTHER PUBLICATIONS

Jerg et al., "DE102010003774A1 English Machine Translation. pdf", Oct. 13, 2011—Machine translation from Espacenet.com.*
Search Report for Italian Patent Application No. 201900022647, dated Jul. 17, 2020.

* cited by examiner

*Primary Examiner* — Levon J Shahinian
(74) *Attorney, Agent, or Firm* — Merchant & Gould P.C.

(57) ABSTRACT

A system (10) includes a support structure (20) associable with a bottom wall (BW) of a washing tub (WT) of a washing machine (WM). The system further includes a container body (22) having a receptacle (14) configured for receiving a quantity of washing agent. The container body (22) has an opening (24) leading into the receptacle (14). The container body (22) is mountable on the support structure (20) in the washing tub (WT). The container body (22) is configured for being reversibly brought by a user into a retracted condition and an extracted condition. In the retracted condition, the container body (22) is inserted in the support structure (20). In the extracted condition, the container body (22) is removed and separate from the support structure (20). The system (10) includes a closure element (16) configured for closing the opening (24).

18 Claims, 6 Drawing Sheets

RESERVOIR SYSTEM FOR A WASHING AGENT, IN PARTICULAR INTENDED FOR BEING INSTALLED ON A WASHING MACHINE, FOR EXAMPLE A DISHWASHER

This application claims the benefit of Ser. No. 102019000022647, filed 2 Dec. 2019 in Italy and is incorporated herein by reference. To the extent appropriate, a claim of priority is made to the above-disclosed application.

TECHNICAL FIELD

The present invention relates to a reservoir system for a washing agent, in particular intended for installation on a washing machine, e.g. a dishwasher.

BACKGROUND ART

Reservoir systems for washing agents are known in the art, in particular intended for installation on a washing machine, e.g. a dishwasher.

However, the known systems have a few drawbacks which should be remedied.

SUMMARY OF THE INVENTION

It is one object of the present invention to provide a reservoir system for a washing agent, in particular for a washing machine, e.g. a dishwasher. According to the present invention, such system is of an improved type, thus overcoming the drawbacks of the prior art.

According to the present invention, this and other objects are achieved through a reservoir system having the technical features set out in the appended independent claim.

It is understood that the appended claims are an integral part of the technical teachings provided in the following detailed description of the present invention. In particular, the appended dependent claims define some preferred embodiments of the present invention that include some optional technical features.

Further features and advantages of the present invention will become apparent in light of the following detailed description, provided merely as a non-limiting example and referring, in particular, to the annexed drawings as summarized below.

For completeness' sake, the following is a list of the alphanumerical references used herein to identify parts, elements and components illustrated in the above-summarized drawings.

WM Washing machine
WT Washing tub
BW Bottom wall
O Access opening
A Lower sprayer axis
OA Outlet aperture
SR Salt reservoir
R1 Rotation movement
T2 Translation movement
T3 Further translation movement
10 Reservoir system
14 Receptacle
16 Closure element
18 Pumping device
20 Support structure
22 Container body
24 Opening
26 Transversally inner portion
28 Transversally outer portion
30 Closed Bottom
32 Axial through cavity
34 Elastic member
36 Locking mechanism
38 Projection
40 Groove
42 Locking section
44 Release section
46 Base wall
48 Suction duct
50 Valve member
52 Protrusion
54 Floating element
56 Permanent magnet
58 Oscillating arm
60 Sealing gasket
62 Transversally inner lip
64 Transversally outer lip
66 Air path
68 External transverse hole
70 Intermediate transverse hole
72 Internal shaped hole
74 Gripping member

DETAILED DESCRIPTION OF THE INVENTION

With reference to the annexed drawings, 10 designates as a whole a reservoir system made in accordance with an exemplary embodiment of the present invention. System 10 is configured for containing or storing a quantity of washing agent, being in particular intended to be installed on a washing machine WM, which in the illustrated example is a dishwasher. More in detail, the washing agent may be, for example, a detergent or a rinse aid.

In the illustrated embodiment, the quantity of washing agent may include a plurality of doses of washing agent to be dispensed during a plurality of wash cycles executed at successive times by the washing machine WM. In particular, each one of such doses can be determined and/or dispensed in a controlled manner during a respective wash cycle of the washing machine WM.

Figure 1:
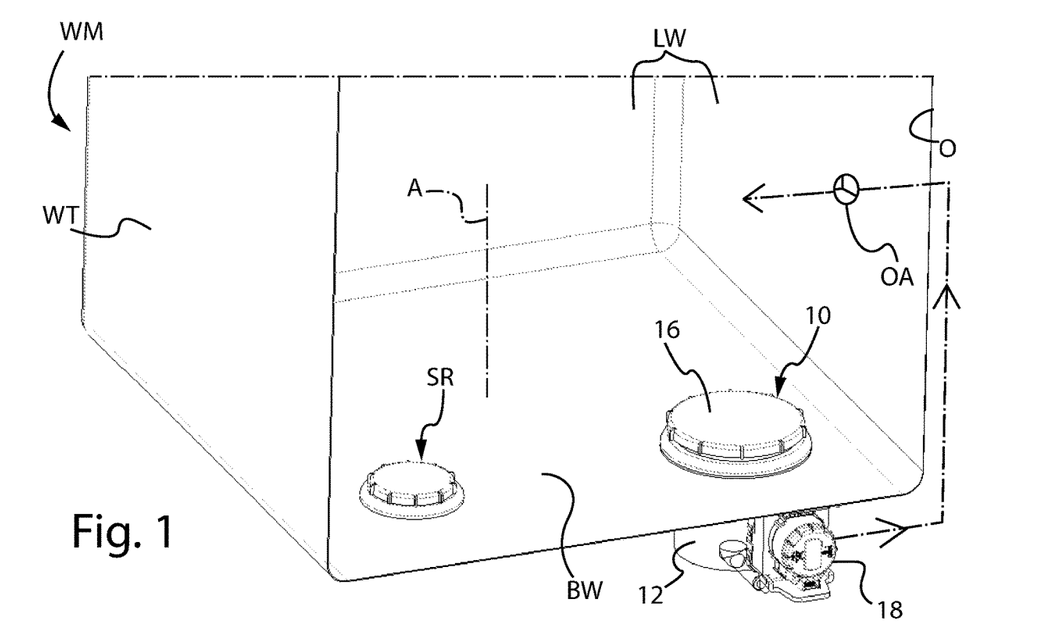
FIG. 1 is a partial perspective view of a washing machine in which a reservoir system for a washing agent has been installed, which is in accordance with one exemplary embodiment of the present invention.

With particular reference to FIG. 1, system 10 is shown therein assembled to washing machine WM. In particular, system 10 is intended to be mounted on bottom wall BW of washing tub WT of the washing machine WM.

In the illustrated embodiment, system 10 is mounted to washing tub WT in proximity to access opening O, particularly in the vicinity of the portion where the door (not shown) of washing machine WM is installed. More specifically, system 10 is conveniently mounted on the side opposite of salt reservoir SR of the decalcifier, with reference to axis A of the lower sprayer (not shown).

Figure 2:
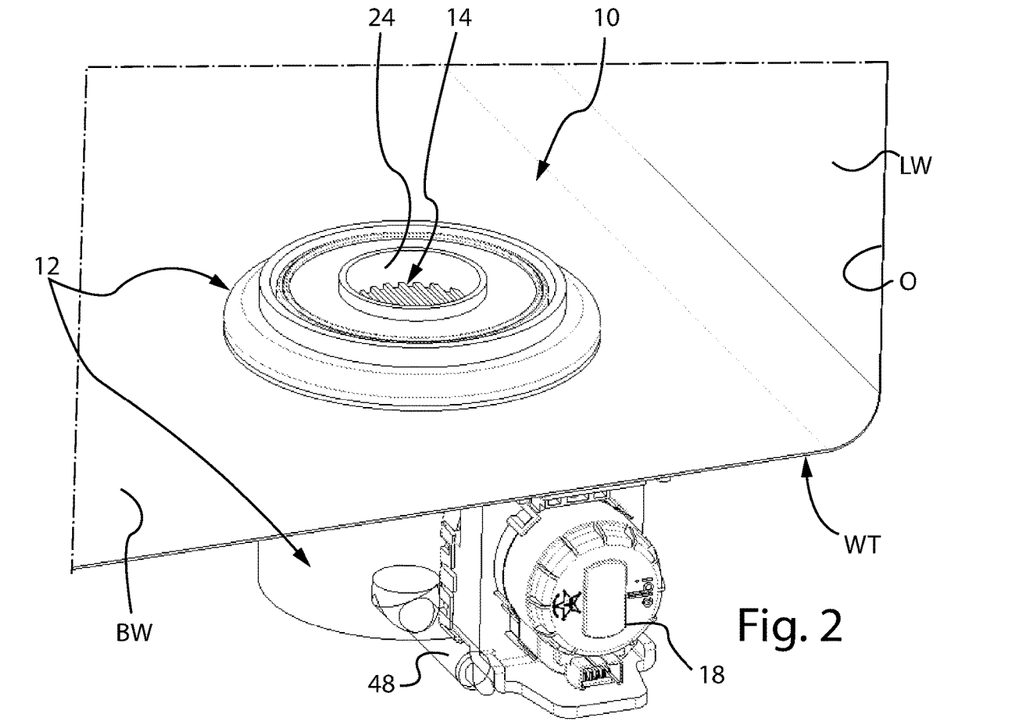
FIGS. 2 to 4 are magnified perspective views illustrating, in three different operating conditions, the reservoir system assembled to the dishwasher and shown in FIG. 1, without a closure element for such system.

With particular reference to FIGS. 1 and 2, system 10 comprises a support structure 20 associable with a bottom wall BW of a washing tub WT of a washing machine WM. In the illustrated embodiment, support structure 20 is configured to be mounted on bottom wall BW and, more in particular, through such bottom wall BW.

System 10 also comprises a container body 22 having a receptacle 14 configured for receiving a quantity of washing agent. As will be described and illustrated in detail hereinafter, container body 22 has an opening 24 leading into receptacle 14 and is intended to be mounted on support structure 20 in washing tub WT of washing machine WM. In particular, in the embodiment illustrated herein receptacle 14 extends at least partially under bottom wall BW.

Furthermore, container body 20 is configured for being reversibly brought by a user into:

a retracted condition (e.g. as visible in FIG. 2), in which container body 22 is inserted in support structure 20, and an extracted condition (e.g. as visible in FIG. 4), in which container body 22 is removed and separate from support structure 20.

The system further comprises a closure element 16 configured for removably closing opening 24. In particular, closure element 16 is removably mounted to support structure 20, so as to close receptacle 14, in particularly in a fluid-tight manner, above bottom wall BW. By way of non-limiting example, closure element 16 is a cap that can be fitted, e.g. by pressure or by screwing it, to support structure 20.

In particular, closure element 16 can be removed by the user: when removed, it performs the function of permitting the loading of washing agent into receptacle 14; when installed, it performs the function of protecting the washing agent from the water in the washing tub and from the heat generated during the various washing and/or drying phases of the wash cycle.

Preferably, system 10 further comprises a pumping device 18 configured for dispensing, in a controlled manner, at least a part or dose of the quantity of washing agent contained in receptacle 14, according to predefined criteria. In particular, as aforementioned, receptacle 14 may be sized for receiving a plurality of doses of washing agent. In other simpler variant embodiments, the pumping device may be an external component, separate and distinct from system 10 and belonging to washing machine WM.

In the illustrated embodiment, pumping device 18 is intended to dispense such part or dose into washing tub WT through an outlet aperture OA (FIG. 1) situated on one of lateral walls LW of washing tub WT. However, as will be apparent to a person skilled in the art, outlet aperture OA may be situated in any position in washing tub WT (e.g. on bottom wall BW); moreover, pumping device 18 may be structured differently, e.g. it may communicate anywhere along the hydraulic washing circuit of dishwasher WM. Preferably, pumping device 18 is mounted integrally with support structure 20.

Figure 3:
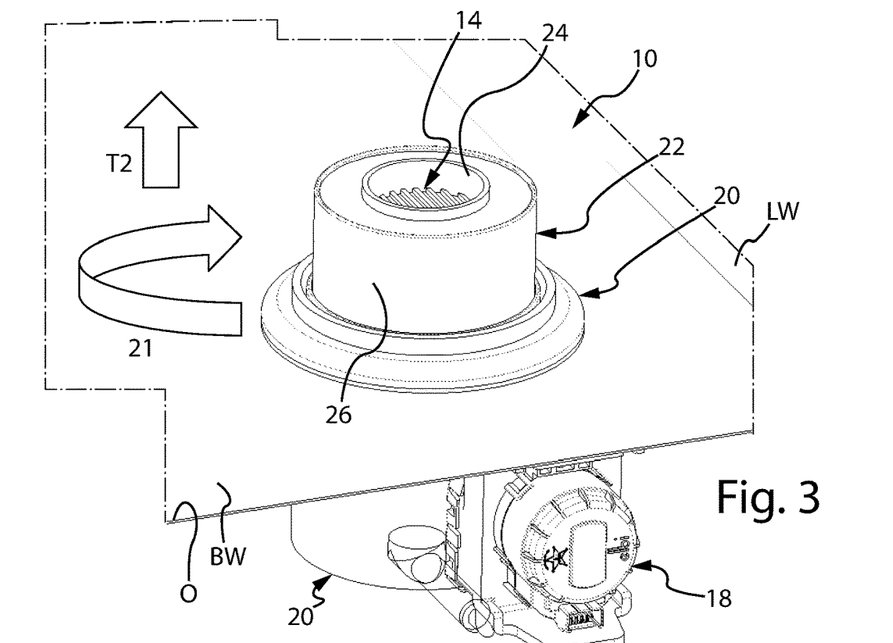
Figure 4:
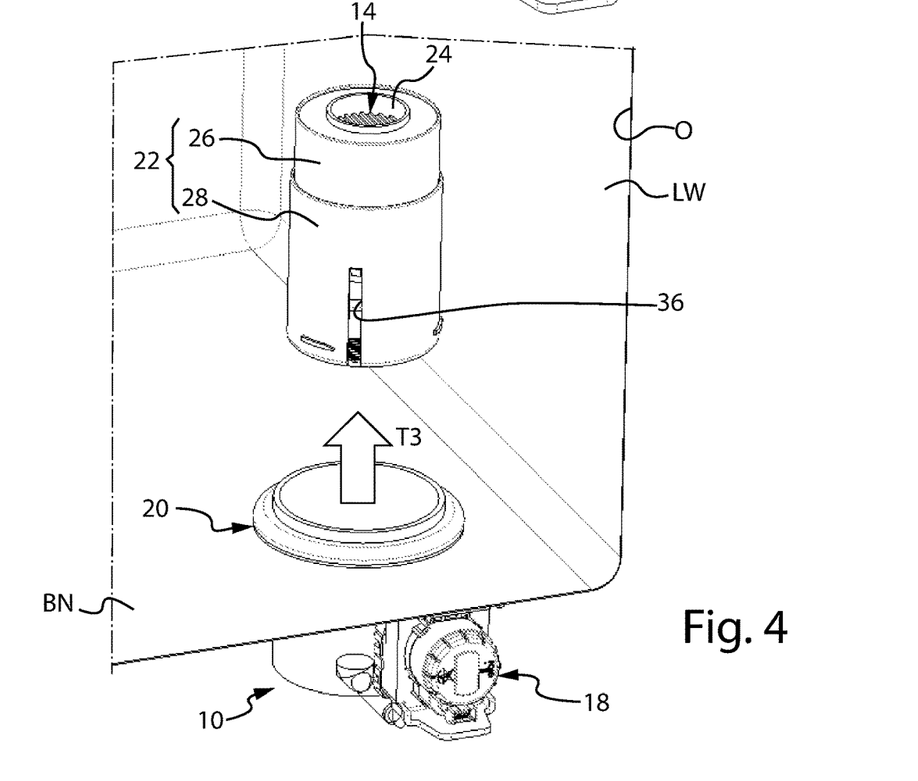
Figure 5:
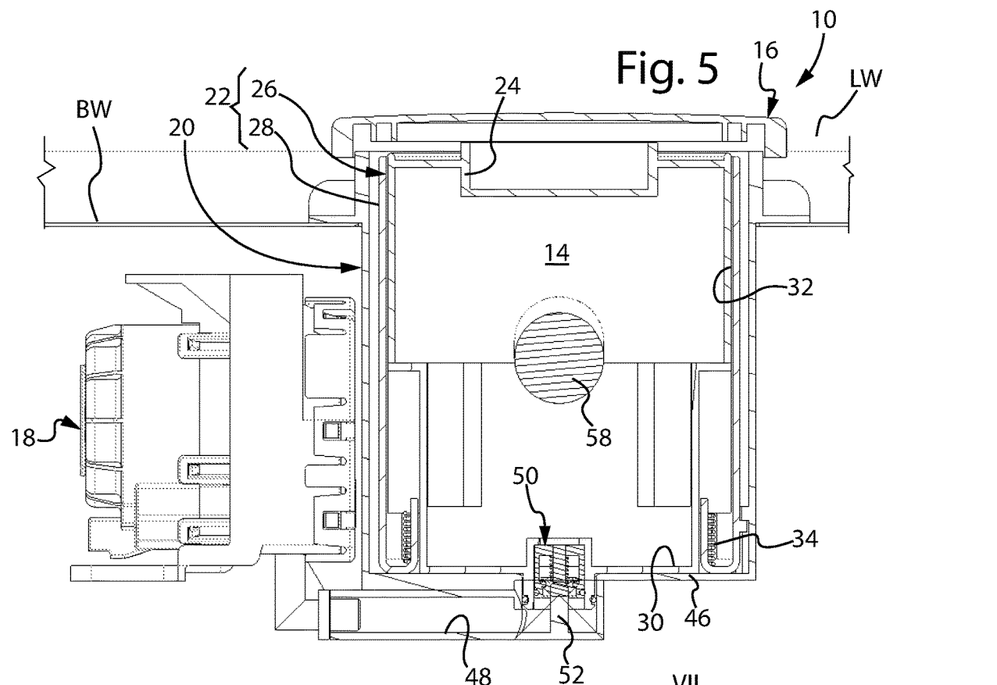
FIGS. 5 and 6 are axially sectional elevation views of the reservoir system shown in the same operating condition as in FIG. 2, wherein the sections run along two mutually perpendicular axial planes.

In the embodiment illustrated herein by way of example, as can be noticed in FIGS. 2 to 4, container body 22 can take a plurality of different operating configurations during the operation of system 10.

In particular, container body 22 comprises a support structure 20 intended to be mounted through bottom wall BW. For example, support structure 20 comprises a flange part 21 (see FIGS. 6 to 8) that protrudes laterally, through which support structure 20 is mounted to bottom wall BW, e.g. by means of suitable fastening means (such as screws or rivets), which, for example, connect such flange to a ring nut (not numbered).

In the illustrated embodiment, container body 22 is adapted to be mounted to support structure 20, in particular inside of it. In addition, container body 22 is configured for taking also an extended condition (FIG. 3) relative to support structure 20. In the extended condition, container body 22 is inserted in support structure 20 and protrudes more from support structure 20 in washing tub WT than in the retracted condition.

In the illustrated embodiment, for container body 22 to be able to switch from the retracted condition to the extended condition it is necessary to remove closure element 16 from container body 22.

In the extended condition, container body 22 is in a raised position relative to support structure 20, and therefore opening 24 is more easily accessible to a user wanting to fill receptacle 14 with the quantity of washing agent.

In the retracted condition, instead, container body 22 is in a receded position or substantially flush with support structure 20.

For example, as will be described more in detail hereinafter, the switching between the retracted condition and the extended condition may advantageously be effected by means of a per se known bayonet-type mechanism. Initially said bayonet-type mechanism operates via a rotation movement R1 exerted by a user on container body 22, so as to mechanically release container body 22 from support structure 20. Subsequently said bayonet-type mechanism operates via a translation movement T2 exerted by the user and/or triggered by an elastic member, so as to bring container body 22 into the extended condition.

Preferably, but not necessarily, as shown in FIG. 4, container body 22 is also capable of assuming an extracted condition, in which it is removed from support structure 20. In the extracted condition, the user can pick up container body 22 and put it in a safe place, where he/she will be more comfortable when filling receptacle 14 with washing agent and/or when cleaning up said container body 22.

For example, the switching of container body 22 into the extracted condition may be effected by a user gripping container body 22 and making a further translation movement T3 in order to lift it from fixed structure 20.

In the illustrated embodiment, as better visible in FIGS. 4 to 8, container body 22 comprises a transversally inner portion 26 and a transversally outer portion 28 slidable one within the other in a substantially telescopic manner. The transversally inner portion 26 and the transversally outer portion 28 are axially closer to each other (in particular, see FIGS. 2, 5, 6 and 7) in said retracted condition, in particular because one is substantially receded in the axial direction inside the other. Conversely, the transversally inner portion 26 and the transversally outer portion 28 are axially farther from each other (in particular, see FIGS. 3 and 8) in said extended condition, in particular because one is substantially jutting out in the axial direction relative to the other.

In the illustrated embodiment, the transversally inner portion 26 has opening 24 and has a closed bottom 30, thus internally defining receptacle 14. In particular, opening 24 is situated at the top of the transversally inner portion 26 and leads into receptacle 14, which ends at the bottom of the transversally inner portion 26. Therefore, the transversally inner portion 26 defines a substantially cup-like shape, which is open at the top and closed at the bottom.

In the illustrated embodiment, the transversally outer portion 28 has an axial through cavity 32, through which the transversally inner portion 26 is configured to slide.

In the illustrated embodiment, container body 22 comprises an elastic member 34 (e.g. a coil spring, in particular compression-loaded) acting between the transversally inner portion 26 and the transversally outer portion 28. Elastic member 34 tends to move the transversally inner portion 26 away from the transversally outer portion 28, i.e. towards the extended condition of container body 22. In this way it is possible to realize or assist the switching from the retracted condition to the extended condition.

In the illustrated embodiment, container body 22 further comprises a locking mechanism 36 configured for being switched by a user between a locking position and, respectively, a release position. In the locking position, locking mechanism 36 mechanically constrains the transversally inner portion 26 and the transversally outer portion 28, thereby preventing any relative movement thereof in the axial direction; thus, container body 22 is retained in the retracted condition (preferably against the action of elastic member 34, if present), and is inhibited from switching into the extended condition. Conversely, in the release position locking mechanism 36 releases the transversally inner portion 26 from the transversally outer portion 28, allowing a relative movement thereof in the axial direction; thus, container body 22 switches from the retracted condition to the extended condition (preferably under the action of, or assisted by, elastic member 34, if present).

In the illustrated embodiment, locking mechanism 36 comprises a bayonet-type coupling between the transversally inner portion 26 and the transversally outer portion 28. For example, such mechanism may include, on one side, a projection 38 carried by the transversally inner portion 26 (or, alternatively, by the transversally outer portion 28). On the other side, said mechanism may include a corresponding shaped groove 40 carried by the transversally outer portion (or, alternatively, by the transversally inner portion 26), in which the projection is configured to slide in a guided manner.

Figure 6:
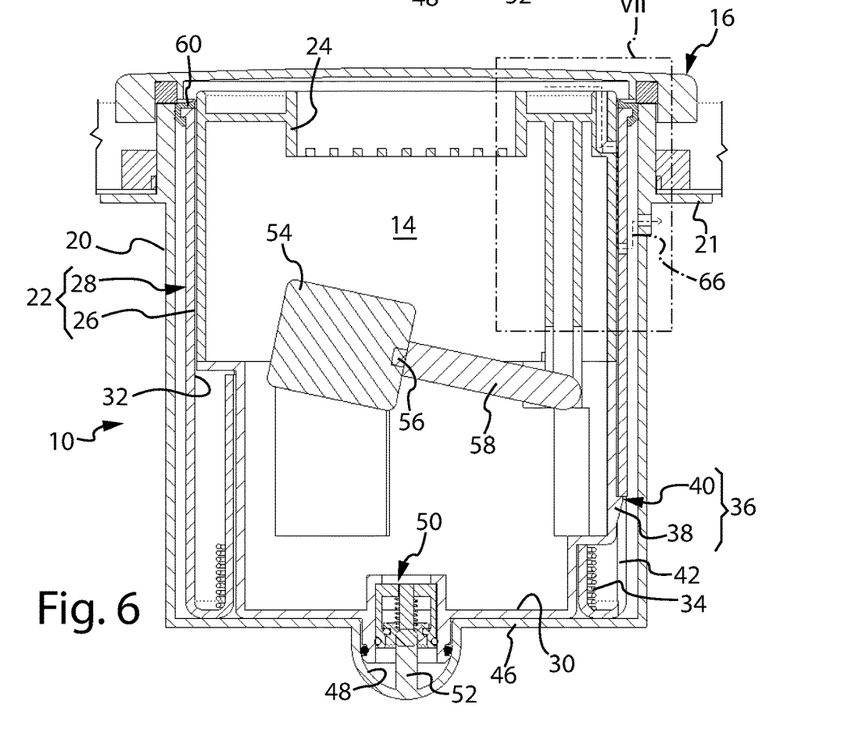

As shown by way of example in FIG. 6, groove 40 may have a locking section 42 extending radially, through which projection 38 can slide, thereby guiding a mutual rotation between the transversally inner portion 26 and the transversally outer portion 28 (with no axial movement relative to the retracted condition of container body 22). As shown by way of example in FIG. 8, groove 40 may have a release section 44, which is adjacent to locking section 42 and into which the latter ends. Release section 44 extends axially, and projection 38 can slide through it, thereby guiding a mutual axial translation between the transversally inner portion 26 and the transversally outer portion 28 (thus allowing container body 22 to move into the extracted condition).

In this embodiment, container body 22 is configured for hydraulically communicating with pumping device 18 when container body 22 is inserted in support structure 20 and is in the retracted condition. Preferably, to container body 22 is configured for interrupting the communication with pumping device 18 when container body 22 is in the extracted condition.

In the illustrated embodiment, pumping device 18 is mounted on support structure 20, in particular on one side of the latter.

In particular, support structure 20 has a substantially cup-like shape and comprises a base wall 46 hydraulically connected to a suction duct 48 of pumping device 18.

Receptacle 14 of container body 22 has a matching bottom wall, e.g. closed bottom 30 of the transversally inner portion 26, configured for lying on base wall 46. Closed bottom 30 is conveniently provided with a valve member 50 configured for hydraulically connecting, in a selective manner, receptacle 14 to suction duct 48 of pumping device 18.

For example, valve member 50 is configured for allowing a fluid to flow from receptacle 14 to suction duct 48 when closed bottom 30 is resting on—or is in the vicinity of—base wall 46. For example, in a manner per se known, the obstructor of valve member 50—which is normally closed—can be moved by a protrusion 52 into an open position, in which it allows a fluid to flow from receptacle 14 to suction duct 48. Protrusion 52 is advantageously carried by base wall 46, and in particular by suction duct 48 (e.g. extending from the bottom of the latter), which raises the obstructor from its seat when closed bottom 30 is resting on—or is in the vicinity of—base wall 46.

Preferably, system 10 further comprises a level sensor configured for sensing the level of the washing agent contained in receptacle 14.

In particular, the level sensor comprises a floating element 54 situated in receptacle 14 and configured for floating on the free surface of the washing agent. In the illustrated embodiment, the level sensor comprises a permanent magnet 56 integral with floating element 54. In addition, the level sensor includes a magnetic sensor (not shown), preferably carried by support structure 20 and configured for sensing the magnetic field generated by permanent magnet 56 and outputting a signal indicative of the level of the liquid contained in receptacle 14 as a function of the position taken by permanent magnet 56 supported by floating element 54. By way of non-limiting example, floating element 54 is mounted on an oscillating arm 58 supported by container body 22, in particular by the transversally inner portion 26, and the magnetic sensor is a per se known angular magnetic sensor.

Preferably, when the magnetic sensor carried by support structure 20 detects no magnetic field emitted by permanent magnet 56, it may be arranged for outputting a signal indicative of the absence of container body 22, and hence of the extracted condition of container body 22.

Figure 7:
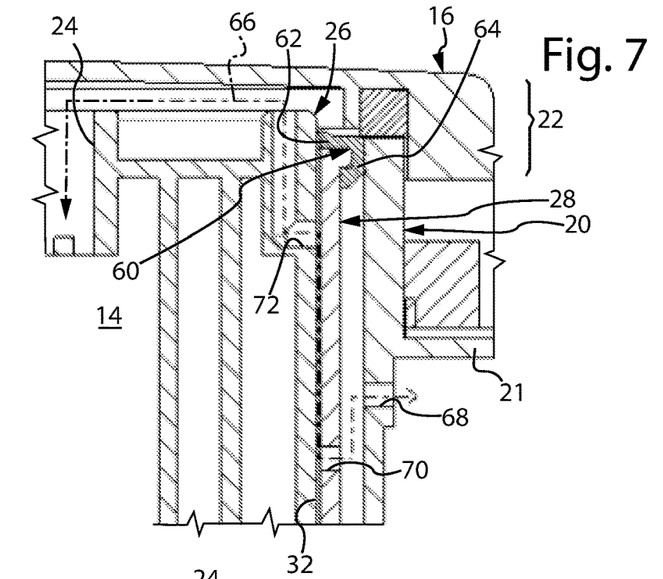
FIG. 7 is a magnified view of a part of the reservoir system enclosed within line VII in FIG. 6.
Figure 8:
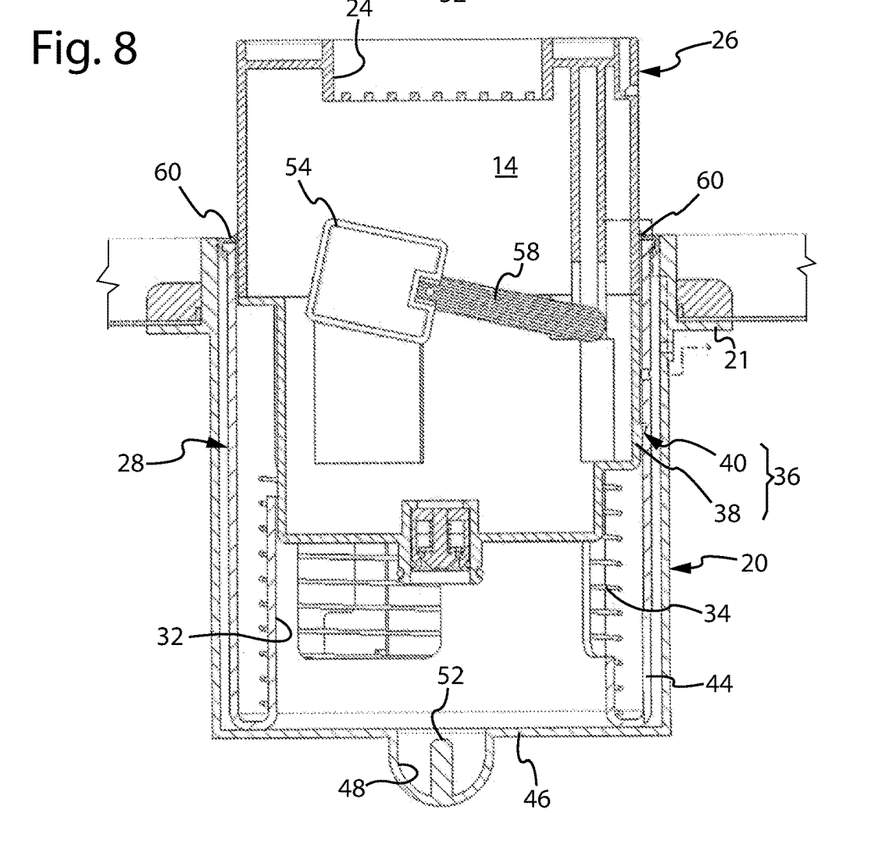
FIG. 8 is a view similar to the one shown in FIG. 6, wherein the reservoir system is shown in the operating condition of FIG. 3.

In the illustrated embodiment, with particular reference to FIGS. 6 to 8, the transversally outer portion 28 has a sealing gasket 60 configured for ensuring fluid tightness between the laterally adjacent components. In particular, sealing gasket 60 is arranged around the top of the transversally outer portion 28.

Preferably, as shown in FIG. 7, sealing gasket 60 has a transversally inner lip 62 configured for sealingly abutting against the external lateral surface of the transversally inner portion 26.

Preferably, as shown in FIG. 7, sealing gasket 60 has a transversally outer lip 64 configured for sealingly abutting against the external lateral surface of support structure 20.

More preferably, the sealing gasket has both the transversally inner lip 62 and the transversally outer lip 64, thus being, advantageously, a double-lip seal.

In the illustrated embodiment, as better shown in FIG. 7, container body 22 comprises an air path 66, indicated by means of a dashed-dotted line. Air path 66 provides communication between:

the environment external to container body 22, in particular to support structure 20, outside washing tub WT (and particularly under bottom wall BW of washing machine WM);

the interspace situated between closure element 16 and the top of container body 22 (and particularly receptacle 14).

The provision of said air path 66 advantageously permits air to be sucked in when pumping device 18 starts operating. Besides, this provides a compensation for the thermal expansion that may occur in the air above the free surface of the washing agent. This compensation-suction of air from the environment under washing tub WT makes it unnecessary to use any additional gaskets, since this is a dry environment that does not require any particular protection against sprinklings of washing water.

In the embodiment illustrated in FIG. 7, air path 66 comprises an external transverse hole 68 in the lateral surface of the wall of support structure 20, through which the air reaches an interspace situated laterally between support structure 20 and transversally outer portion 28. Air path 66 further comprises an intermediate transverse hole 70 in the lateral surface of the wall of the transversally outer portion 28, through which the air reaches another interspace situated laterally between the transversally outer portion 28 and the transversally inner portion 26. Furthermore, air path 66 comprises an internal shaped hole 72 (in particular, L-shaped) in the lateral surface of the wall of the transversally inner portion 26, through which the air reaches an interspace situated between closure element 16 and the top of the transversally inner portion 26.

Optionally, air path 66 may include a breathable element (not numbered), e.g. made of Gore-Tex, which is configured to allow the air to pass through and is substantially impermeable to the liquids contained in container body 22. In particular, the breathable element allows the air to pass through under the suction and compensation effects. Preferably, the breathable element is interposed between support structure 20 and the outside environment, in particular it is situated in external transverse hole 68. This prevents any undesired overflow or leakage of liquids towards the base of the washing machine (where there are typically live electric components, cables and connections), particularly when overturning or tilting the machine for testing or maintenance operations.

Figure 9:
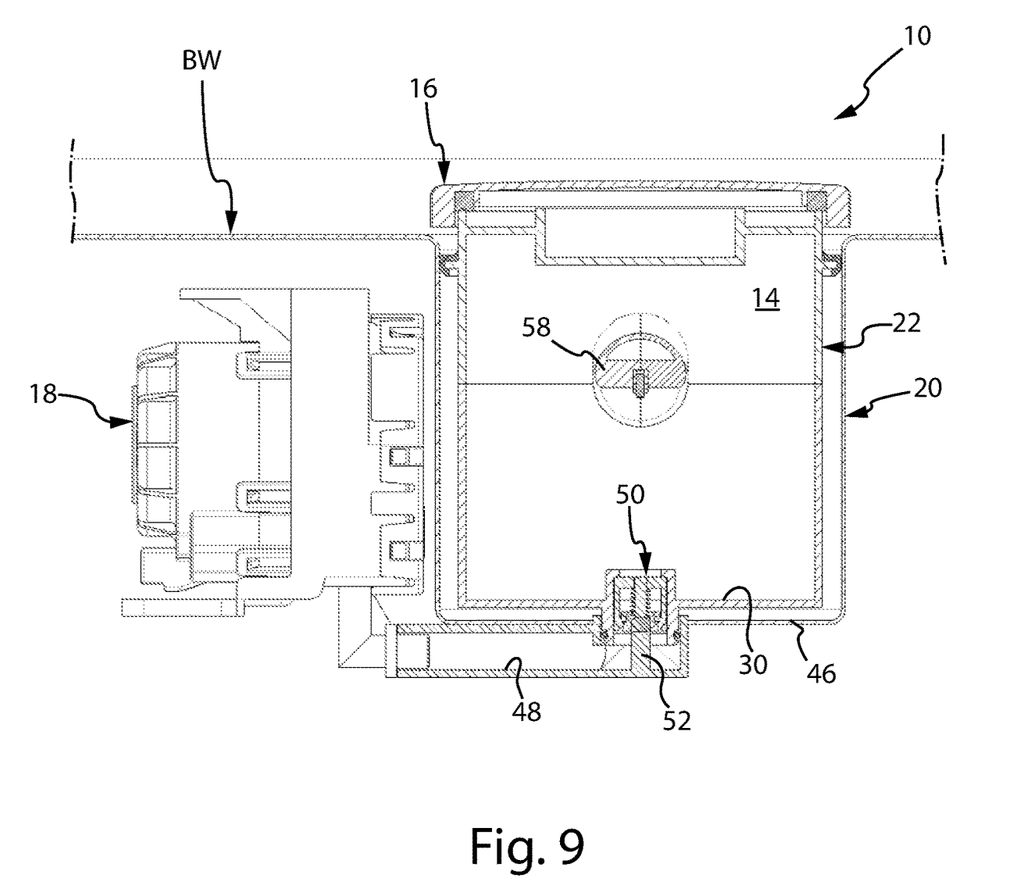
FIG. 9 is a view of the reservoir system obtained in accordance with a variant embodiment of the present invention.

With reference to FIG. 9, there is shown a variant embodiment of system 10, wherein support structure 20 is made as one piece integrally with said bottom wall BW.

Figure 10:
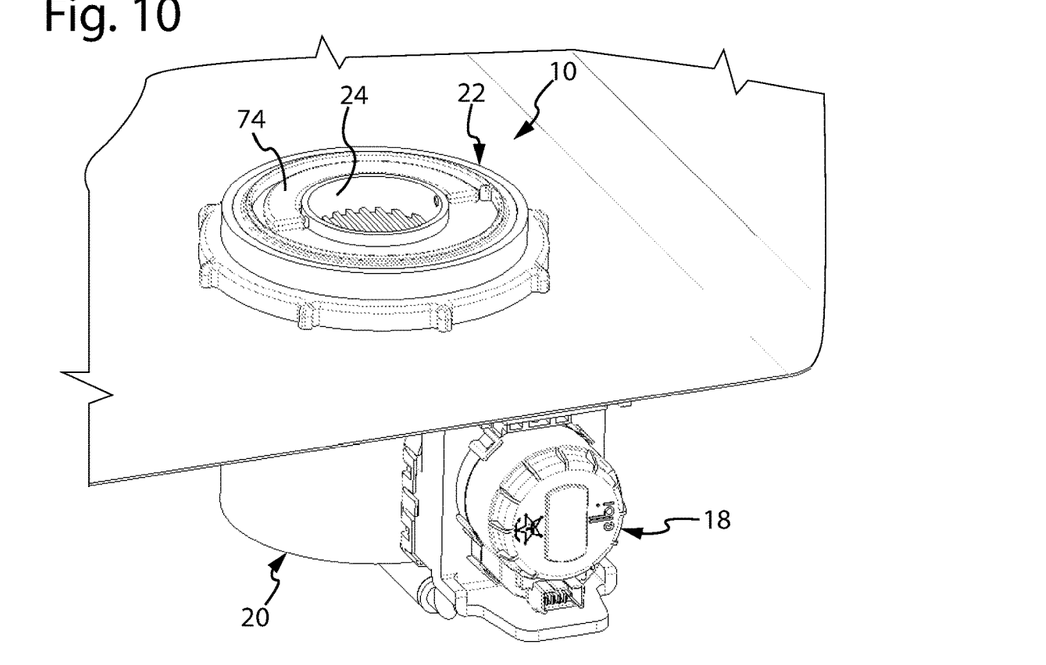
FIGS. 10 and 11 are perspective views of a reservoir system made in accordance with a further variant embodiment of the present invention, shown in two different conditions.
Figure 11:
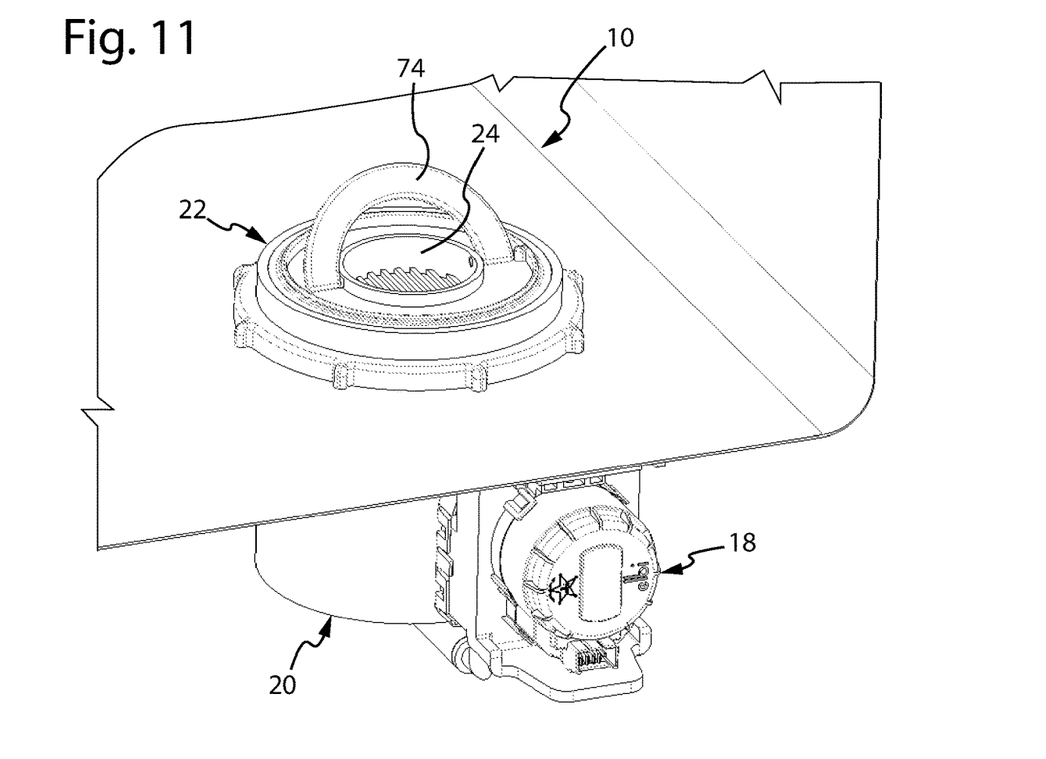

With reference to FIGS. 10 and 11, there is shown a variant embodiment wherein container body 22 comprises a gripping member 74 configured for being gripped by a user. In particular, by pulling gripping member 74 it is possible to easily switch the container body from the retracted condition to the extended condition.

Preferably, gripping member 74 is mounted movable between an inoperative position (FIG. 10), in which it does not protrude beyond the outline of the rest of container body 22, and an operative position (FIG. 11), in which it protrudes from the outline of the rest of container 22 and can be subjected to a pulling force by the user in order to be switched from the retracted condition to the extracted condition. For example, gripping member 74 is mounted in such a way that it can oscillate between the inoperative position and the operative position, with respect to the rest of container body 22, particularly with respect to the transversally outer portion 26. In the illustrated embodiment, gripping member 74 is a handle, in particular an arched handle hinged at its ends to the rest of container body 22.

Of course, without prejudice to the principle of the invention, the forms of embodiment and the implementation details may be extensively varied from those described and illustrated herein by way of non-limiting example, without however departing from the scope of the present invention as set out in the appended claims.

The invention claimed is:

1. A reservoir system for a washing agent for installation on a washing machine; said system comprising:

a support structure associable with a bottom wall of a washing tub of a washing machine;

a container body having a receptacle configured for receiving a quantity of washing agent; said container body having an opening leading into said receptacle; said container body being mountable on said support structure in said washing tub and being further configured for being reversibly brought by a user into:

a retracted condition, in which said container body is inserted in said support structure, and an extracted condition, in which said container body is removed and separate from said support structure;

a closure element configured for removably closing said opening; and a pumping device configured for dispensing, in a controlled manner, at least a part or dose of a quantity of washing agent contained in said receptacle.

2. The system according to claim 1, wherein said support structure is made as one piece integrally with said bottom wall.

3. The system according to claim 1, wherein said support structure is configured for being mounted on said bottom wall.

4. The system according to claim 3, wherein said support structure is configured for crossing said bottom wall.

5. The system according to claim 1, wherein said closure element is mounted on said support structure.

6. The system according to claim 5, wherein said support structure is made as one piece integrally with said bottom wall, and wherein said container body takes said extracted condition when said closure element is removed from said support structure.

7. The system according to claim 1, wherein said container body comprises a gripping member configured for being gripped by a user.

8. A reservoir system for a washing agent for installation on a washing machine; said system comprising:

a support structure associable with a bottom wall of a washing tub of a washing machine;

a container body having a receptacle configured for receiving a quantity of washing agent said container body having an opening leading into said receptacle; said container body being mountable on said support structure in said washing tub and being further configured for being reversibly brought by a user into:

a retracted condition, in which said container body is inserted in said support structure, and an extracted condition, in which said container body is removed and separate from said support structure; and a closure element configured for removably closing said opening;

wherein said container body is configured for taking an extended condition, wherein said container body is inserted in and protrudes more from said support structure in said washing tub than in the retracted condition.

9. The system according to claim 8, wherein said container body comprises a transversally inner portion and a transversally outer portion slidable one within the other in a substantially telescopic manner; said portions being axially closer to each other in said retracted condition and, respectively, axially farther from each other in said extended condition.

10. The system according to claim 9, wherein said transversally inner portion has said opening and has a closed bottom, internally defining said receptacle.

11. The system according to claim 10, wherein said transversally outer portion has an axial through cavity, through which said transversally inner portion is configured to slide.

12. The system according to claim 8, wherein said container body comprises an elastic member acting between said portions and biasing said portions away from each other, towards said extended condition of said container body.

13. The system according to claim 8, wherein said container body further comprises a locking mechanism configured for being reversibly switched by a user between:
    a locking position, in which the locking mechanism mechanically constrains said portions to each other, thereby preventing relative movement between said portions in an axial direction, to retain said container body in said retracted condition; and
    a release position, in which the locking mechanism mechanically releases said portions from each other, thereby allowing a relative movement between said portions in the axial direction, to allow said container body to switch into said extended condition.

14. The system according to claim 13, wherein the locking mechanism comprises a bayonet-type coupling between said portions.

15. A reservoir system for a washing agent for installation on a washing machine; said system comprising:
    a support structure associable with a bottom wall of a washing tub of a washing machine;
    a container body having a receptacle configured for receiving a quantity of washing agent said container body having an opening leading into said receptacle; said container body being mountable on said support structure in said washing tub and being further configured for being reversibly brought by a user into:
        a retracted condition, in which said container body is inserted in said support structure, and
        an extracted condition, in which said container body is removed and separate from said support structure; and
    a closure element configured for removably closing said opening;
    wherein said container body comprises an air path which, in said retracted condition, provides communication between:
    an environment external to the support structure, outside said washing tub;
    an interspace situated between said closure element and a top of said container body, leading into said receptacle.

16. The system according to claim 15, wherein said air path includes a breathable element configured to allow air to pass through said support structure, which substantially prevents liquids from exiting said support structure.

17. A reservoir system for a washing agent for installation on a washing machine; said system comprising:
    a support structure associable with a bottom wall of a washing tub of a washing machine;
    a container body having a receptacle configured for receiving a quantity of washing agent said container body having an opening leading into said receptacle; said container body being mountable on said support structure in said washing tub and being further configured for being reversibly brought by a user into:
        a retracted condition, in which said container body is inserted in said support structure, and
        an extracted condition, in which said container body is removed and separate from said support structure;
    a closure element configured for removably closing said opening; and
    a level sensor configured for sensing a level of the washing agent contained in the receptacle.

18. The system according to claim 17, wherein said level sensor is configured for outputting a signal indicative of said extracted condition of said container body from the support structure.

* * * * *